UNITED STATES PATENT OFFICE.

SABBATI E. ULLMAN, OF NEW YORK, N. Y.

SERUM-ALBUMEN PEPTONE.

SPECIFICATION forming part of Letters Patent No. 402,494, dated April 30, 1889.

Application filed August 31, 1888. Serial No. 284,248. (No specimens.)

*To all whom it may concern:*

Be it known that I, SABBATI E. ULLMAN, a citizen of the United States, residing at the city, county, and State of New York, have invented certain new and useful Improvements in Peptones; and I do hereby declare that the following is a full, clear, and exact description of the invention, which will enable others skilled in the art to which it appertains to make and use the same.

This invention relates to that class of products known as "peptones," sometimes called "peptone-pepsins," and which are produced by the action of pepsin upon an animal substance. Heretofore such products have been made by the action of pepsin upon the stomach-tissues, from which the pepsin itself is derived; also by the action of pepsin upon desiccated egg-albumen; also by the action of pepsin upon the fibrin of the blood, and also by the action of pepsin upon the muscular tissues. While each of these results in the production of a peptone of greater or less value, each is subject to certain defects, which impair the value of the product. In that first mentioned the impurities inherent in the construction of the stomach or pepsin-producing membrane are retained in the peptone. In the second the manufacture is in practice carried on with desiccated egg-albumen, which is subject to chemical changes, contamination, and deterioration, which impair its purity and value, and in the third the fibrin must of necessity be prepared by methods to a great extent tedious, slow, and expensive, while in the fourth the amount of finished product produced, owing to its proneness to deterioration by fermentation without the addition of other substances, makes this product expensive, and in some cases dangerous to life by the formation of poisonous ptomaines.

In my invention I subject serum of the blood to the action of the digestive ferment pepsin, with the result of producing a peptone of great strength and value at a small cost, and without any objectionable element heretofore attendant upon the manufacture of peptone.

In the production of my improved peptone or peptone-pepsin I take fresh animal stomachs, preferably that of the pig, which should be chopped fine in the manner well understood in the manufacture of commercial pepsin, and macerate the same in water which has been acidulated with any suitable acid— as, for example, hydrochloric or sulphuric acid in the proportion of one pound of acid to fourteen gallons of water, more or less, as may be desired—and allow the same to stand at a temperature of from 60° to 75° Fahrenheit, with frequent stirring, until a suitable amount of pepsin contained in the animal stomach is imparted in a soluble form to the acidulated water. I then decant the liquid portion from the stomachs, and to this acidulated solution of pepsin I add sufficient blood-serum, which will vary in amount according to the digestive power of the pepsin contained in the acidulated solution, and concentrate the mixture at a temperature varying from 100° to 120° Fahrenheit, which is best suited for the action of the pepsin upon the albumen contained in the blood-serum to convert the albumen into a peptone. The product is a strong and easily-assimilated peptone, and is practically free from the impurities of peptones heretofore known in commerce.

My said improved peptone is practically free from the impurities that form from the decomposition of the tissues of the animal stomach and from the production of chemical changes incident to dried egg-albumen and flesh tissues, while it is richer in nitrogenous matters, as well as produced with much less labor and care than is possible when other albuminous substances are used in the manufacture or production of commercial peptones or peptone-pepsins.

My invention is not limited to a peptone or peptone-pepsin produced by the particular process herein set forth, inasmuch as any peptone or peptone-pepsin resulting from the action of a pepsin upon blood-serum is within my said invention.

What I claim as my invention is—

A peptone or peptone-pepsin composed of the peptonized albumen of blood-serum, substantially as herein set forth.

SABBATI E. ULLMAN.

Witnesses:
 CHARLES A. HERBERT,
 ISIDORE A. LEVY.